United States Patent [19]
Kraus

[11] 3,722,259
[45] Mar. 27, 1973

[54] RESISTANCE HEATER TEST CAPSULE CONSTRUCTION

[75] Inventor: Thaddaus Kraus, Furstentum, Liechtenstein

[73] Assignee: Balzers Patent-Und Beteiligungs-Aktiengesellschaft, Balzers, Furstentum, Liechtenstein

[22] Filed: July 6, 1971

[21] Appl. No.: 159,836

[30] Foreign Application Priority Data

July 20, 1970 Switzerland...................011024/70

[52] U.S. Cl................................................73/19, 13/20
[51] Int. Cl.............................G01n 25/14, F27d 11/02
[58] Field of Search...73/19; 13/20, 23, 25; 219/427; 285/330

[56] References Cited

UNITED STATES PATENTS

| | | |
|---|---|---|
| 3,283,780 | 11/1966 | Sutton...........................285/330 X |
| 2,473,909 | 6/1949 | Ruchti..............................285/330 |
| 3,371,142 | 2/1968 | Soller............................219/427 X |
| 1,981,015 | 11/1934 | Williams...........................219/427 |

*Primary Examiner*—Richard C. Queisser
*Assistant Examiner*—Herbert Goldstein
*Attorney*—John J. McGlew et al.

[57] ABSTRACT

A test capsule made of graphite which can be clamped between current supply electrodes and heated by current passage therethrough includes interengageable container-forming portions which, when fitted together, form a closed cylindrical capsule. The two parts are made of substantially identical size and configuration and they have corrugated or wavy-form side edges which interengage and interlock without a joint upon closing.

4 Claims, 6 Drawing Figures

PATENTED MAR 27 1973

INVENTOR.
THADDÄUS KRAUS
BY
John J. McKew
ATTORNEY

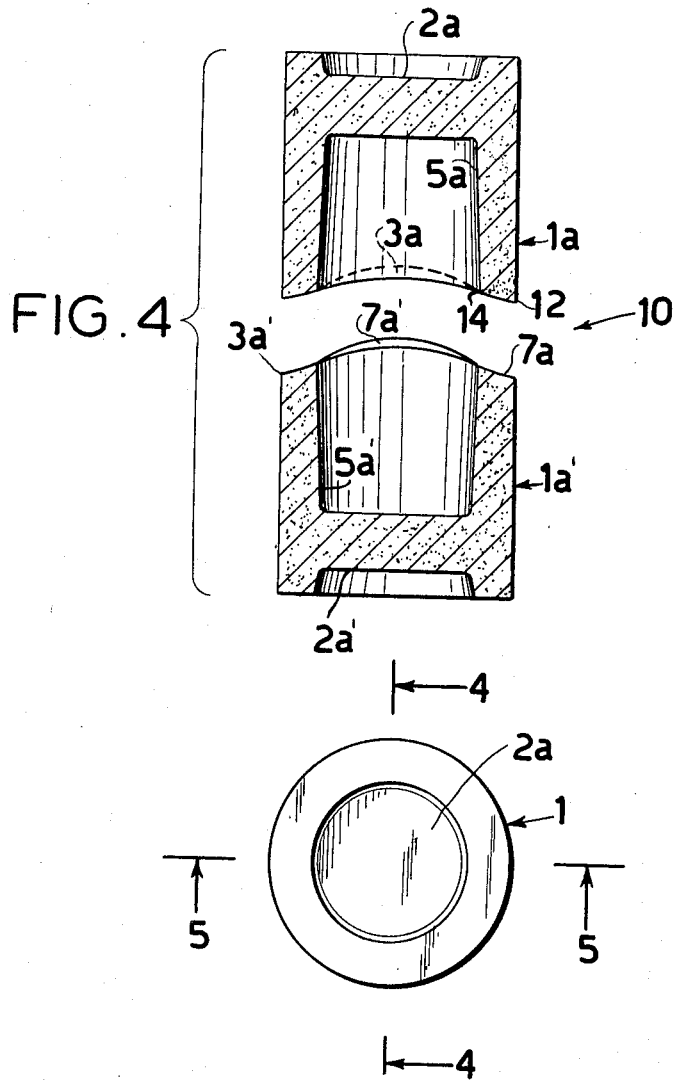
FIG. 4
FIG. 5
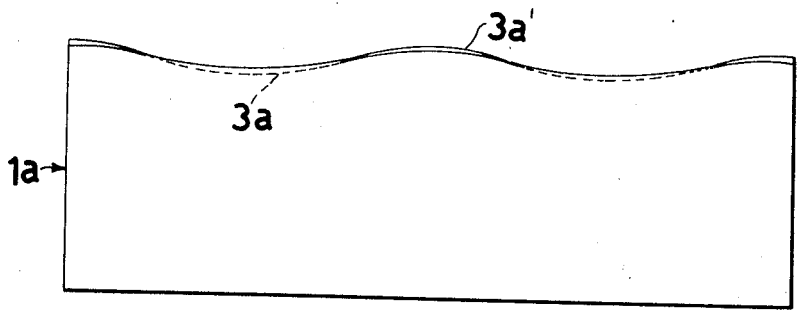
FIG. 6
INVENTOR.
THADDÄUS KRAUS 3,722,259

RESISTANCE HEATER TEST CAPSULE CONSTRUCTION

BACKGROUND OF THE INVENTION

1. Field of the Invention

This invention relates in general to testing equipment and, in particular, to a new and useful graphite test capsule which forms a resistance heater for determining the gas content of materials, and which includes interengageable wavy-form side edges.

2. Description of the Prior Art

Graphite capsules for use in holding samples and which form resistance heaters held between current electrodes are known. Devices of this type are used particularly for the examination of samples, particularly for the analytical determination of their gas content. The sample to be examined is enclosed in a small container of graphite which is clamped between two electrodes and heated by direct current passage therethrough. The gases given off by the sample escape from the container and are fed to a measuring instrument for determination of their type and amount. A known device of this type is described in detail in Swiss Pat. application, Ser. No. 461,141. Another furnace suitable for gas analysis in a simple container for such analysis are described in Z. analit. Chim. 20 (1965), pages 1359–64, Russ. Engl. translation: Journal of Analytical Chemistry of USSR 20 (1965), pages 1390–94.

Heretofore, test capsules were used which consisted of a lower part and a cover. Since a new capsule is used for each sample, the production costs plays a very important part in conducting the analysis. Difficulties were encountered in the production of the known graphite capsules because the covers of the capsules, which were formed of thin walls to save costs, were warped during graphitization. One possibility of reducing the cost would be to make the two-part capsules of two equal parts which are substantially identical and which are made so that they interfit. With such a technique, the same pressing tool can be used to produce both the capsule and the cover parts simultaneously. A difficulty with such an arrangement however is that, when the capsules are clamped between the electrodes to cause their heating, two parts of the capsule must be centered and must not move relative to each other during the heating which might possibly happen, for example, due to the uneven stresses or to the pressing of the parts together in areas which are not exactly plane parallel. The use of special centering devices would be uneconomical.

SUMMARY OF THE INVENTION

In accordance with the present invention, there is provided a capsule form which meets the necessary operational requirements and which can be produced cheaply by pressing. The capsule is made of two parts of graphite and the parts are made of identical configuration and include engagement surfaces formed at the ends of each side edge, which are of wavy or corrugated form so that, when two capsule parts are placed together end-to-end, they interfit along the wavy engagement edges which touch each other and interlock without a joint upon closing. The two graphite parts provide end portions which may be engaged by electrodes in order to operate the capsule as a resistance heater through which a current is passed. The interfitting parts close tightly and provide a means for examining samples according to the hot extraction method. The halves are constructed so that, when they are closed in the assembly, the wavy edges form an automatic centering of the parts and a closure which does not permit relative rotation of the parts nor a lateral displacement. The construction thus permits an automatic and precise centering and closing of the two parts to form a closed graphite capsule without requiring any special centering tools.

Accordingly, it is an object of the invention to provide an improved graphite capsule made up of two substantially identical parts which have interfitting edge formations of wavy form which interfit and interlock without a joint upon closing.

A further object of the invention is to provide a graphite capsule usable for determining the gas content of samples and which is simple to design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated preferred embodiments of the invention.

BRIEF DESCRIPTION OF THE DRAWING

FIG. 4 is a view similar to FIG. 1 of another embodiment of the invention in which the upper part is taken along the line 4—4 of FIG. 5 and the lower part is taken along the line 5—5 of FIG. 5;

FIG. 5 is a top plan view of the capsule shown in FIG. 4; and

FIG. 6 is a developmental view of a capsule showing the engagement edge of the embodiment of FIG. 4.

GENERAL DESCRIPTION OF THE PREFERRED EMBODIMENTS

Figure 1:
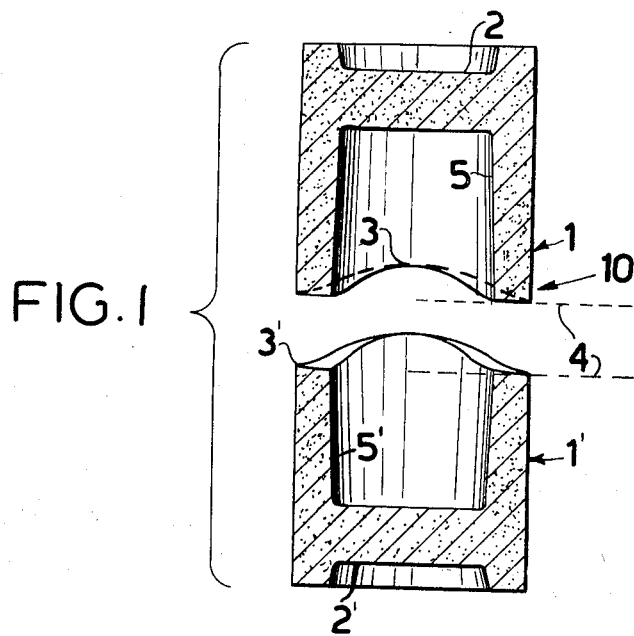
FIG. 1 is an exploded transverse sectional view of a two-part capsule with the upper part being shown as taken along the line 1—1 of FIG. 2, and the lower part being taken along the line 2—2 of FIG. 2.
Figure 2:
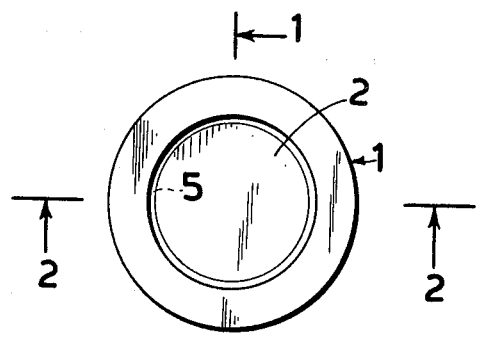
FIG. 2 is a top plan view of the capsule shown in FIG. 1.

Referring to the drawings in particular, the invention embodied therein in FIGS. 1 and 2 comprises a graphite capsule generally designated 10 which includes a top portion 1 and a bottom portion 1' which are of identical configuration. Each capsule is of cylindrical construction with an end face comprising a top wall or cover 2 or a bottom wall 2'.

In accordance with the invention, each capsule part 1 and 1' is identical in every respect and includes a contact surface 3 of wavy or corrugated form formed at the end faces of the side walls 5 & 5'. When the parts are oriented as shown in FIG. 1, they may be enclosed together to position a crest portion of one part into a recess portion of the other part of the wavy contact surfaces 3 and 3'. The contact surfaces 3 and 3' interlock in a form closed manner. The lower part 1' is oriented at 90° from the upper part 1 in the embodiment shown as indicated by the section lines taken in respect to FIG. 2.

Figure 3:
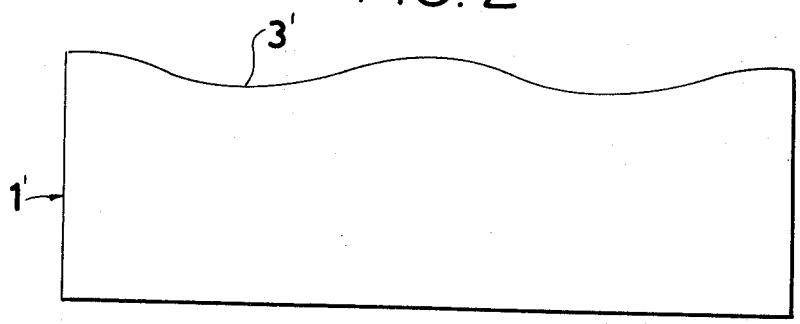
FIG. 3 is a development of the engagement edge of one of the capsules.

As shown in FIG. 3, the generatrix 4 of the contact surface, which in the closed capsule position represents the separating surface between the two parts 1 and 1', comprises a straight line which extends perpendicular to the cylinder axis and to the superficies. The development of the separating line as shown at 3' in FIG. 3 and which can be seen on the outer shell surface of the closed capsule at the edge 3 or 3', is formed by the intersection of the contact surface and the outer shell surface and on a plane, the surface yields a wave line with two cycle formations.

In the embodiment of the invention shown in FIGS. 4 to 6, there is provided a capsule 10' having parts which are similarly designated but with an $a$. In this construction, the contact edges 3a and 3a' are of wavy configuration and, in addition, a forward edge 12 of the side wall bounding the contact surface, is at a different elevation from the interior edge 14. The slope between the edges 12 and 14 is preferably partially spherical or curved and it is preferable that the elevations of the forward edge 12 and the interior edge 14 change in an inverse manner preceding around the periphery of the contact surfaces. The separating surface 7a' represents a saddle surface which interengage in a manner such that lateral displacement of the clamped capsule halves is impossible. The surfaces 7a can be turned about two axes perpendicular to the cylinder axis so that any inaccuracies of the clamping device may be compensated.

In FIG. 6, a development of the contact surfaces 3a and 3a' are shown in solid lines and in dotted lines respectively.

While specific embodiments of the invention have been shown and described in detail to illustrate the application of the principles of the invention, it will be understood that the invention may be embodied otherwise without departing from such principles.

What is claimed is:

1. A two-part test capsule made of a graphite material for examining samples according to a hot extraction method, comprising first and second interengageable graphite cylinders having side walls with abutment edges of complementary wave-shaped configuration permitting interengagement of the said abutment edges so that they interlock in abutting contact without a joint upon closing of said capsule, said cylinders having means at their outer ends for clamping these parts between current supply electrodes for being heated by current passage therethrough.

2. A two-part test capsule according to claim 1 wherein the abutment surfaces of said parts are formed by a wave shaped surface whose generatrix is perpendicular to the axis of each of said cylindrical parts.

3. A two-part test capsule according to claim 1, wherein the graphite cylinders each include a closed end having an exterior face with a central recess and an encircling rim around the recess defining a respective electrode connection end.

4. A two-part test capsule according to claim 1 wherein said abutment surfaces include an outer edge with a different elevation than the inner edge and with the surface extending therebetween sloping gradually between said edges.

* * * * *